United States Patent [19]

Chen et al.

[11] 4,175,211
[45] * Nov. 20, 1979

[54] METHOD FOR TREATMENT OF RUBBER AND PLASTIC WASTES

[75] Inventors: Nai Y. Chen, Titusville, N.J.; Tsoung-Yuan Yan, Philadelphia, Pa.

[73] Assignee: Mobil Oil Corporation, New York, N.Y.

[*] Notice: The portion of the term of this patent subsequent to Aug. 22, 1978, has been disclaimed.

[21] Appl. No.: 882,308

[22] Filed: Mar. 1, 1978

Related U.S. Application Data

[62] Division of Ser. No. 777,509, Mar. 14, 1977, Pat. No. 4,108,730.

[51] Int. Cl.² .................................................. C07C 3/26
[52] U.S. Cl. ............................................. 585/241; 201/2.5; 201/25
[58] Field of Search ................... 260/683 PD, 677 XA; 201/2.5, 25

[56] References Cited

U.S. PATENT DOCUMENTS

| 2,385,326 | 9/1945 | Bailey | 260/683 PD |
| 2,514,332 | 7/1950 | Murphree | 260/683 PD |
| 3,750,600 | 8/1973 | Ohsol et al. | 260/683 PD |
| 3,845,157 | 10/1974 | Woo | 260/683 PD |

Primary Examiner—C. Davis
Attorney, Agent, or Firm—Charles A. Huggett; Michael G. Gilman; Raymond W. Barclay

[57] ABSTRACT

A process for converting relatively ash-free solid polymeric wastes to more valuable liquid, solid, and gaseous products which comprises mixing rubber and/or plastic wastes at high temperatures in a refractory petroleum stream and catalytically cracking the mixture.

5 Claims, 2 Drawing Figures

METHOD FOR TREATMENT OF RUBBER AND PLASTIC WASTES

This is a division of application Ser. No. 777,509, filed Mar. 14, 1977, now U.S. Pat. No. 4,108,730.

BACKGROUND OF THE INVENTION

1. Field of the Invention

This invention relates to a process for the treatment of rubber and plastic wastes and, in particular, to a method for converting such material to liquid and gaseous fuels and chemicals by catalytically cracking a mixture of the solid polymeric wastes and selected petroleum-derived streams.

2. Description of the Prior Art

Given the proliferation of used rubber tires, plastic packaging materials, one-way plastic containers, and by-product and substandard polymers, improved methods of recovering the hydrocarbon values contained therein are needed, particularly in view of the increasing scarcity of oil and natural gas. The potentially valuable hydrocarbons in such materials would be better utilized if an economically attractive method could be devised for transforming them into useful liquid, solid, and/or gaseous hydrocarbon products having utility as fuel or as petrochemical raw materials.

Waste rubber and plastics are not conveniently burned; sulfur is released in the form of sulfur oxides which must be removed from the combustion gases prior to their discharge to the atmosphere. Rubber and plastics disposed of in incinerators melt and stick to the grate of the incinerator, causing high temperatures at the grate which can damage the incinerator.

It has been proposed to pyrolytically decompose rubber and plastic wastes by feeding the wastes either directly or in the molten state to a pyrolysis reaction furnace and maintaining the wastes therein for a sufficient period of time to decompose the wastes. For example, U.S. Pat. No. 3,956,414 describes a method of converting solid, amorphous polyolefin material to a liquid oil product which comprises melting the polyolefin by heating with a petroleum hydrocarbon oil and thermally cracking the resulting melt at a temperature of about 250° to 450° C. Other variations of the pyrolytic decomposition process are described in U.S. Pat. Nos. 3,674,433; 3,823,223; 3,832,151; and 3,984,288. The chief disadvantage of this approach is the amount of time required for the process to generate useful products in that heating times in excess of three hours are often required to decompose the rubber and plastics.

Defensive Publication No. T940,007 describes a process for the conversion of waste rubber to produce hydrocarbon gases, low-sulfur fuel oil, and a carbonaceous residue suitable for re-use as carbon black which comprises heating and reacting rubber in the presence of molten acidic halide Lewis salt catalysts.

U.S. Pat. No. 3,704,108 represents still another approach to the disposal of rubber tires. The process of that invention catalytically hydrogenates scrap tires in an autoclave reactor under hydrogen pressure ranging between about 500 to 2000 psig and temperatures ranging between about 600° to 850° F. The chief disadvantage of the process is the high operating costs caused by the necessity of employing added molecular hydrogen. Additional costs are incurred by the necessity of using an autoclave reactor to withstand the high operating pressures.

SUMMARY OF THE INVENTION

Solid polymeric wastes such as rubber tires, plastic wares, plastic packagings, scrap plastics, etc., contain high molecular weight hydrocarbon molecules. By heating these high molecular weight substances in the presence of a petroleum oil, preferably aromatic streams such as FCC heavy cycle oil, at temperatures between 150° F. and 700° F. in the absence of air and added molecular hydrogen, dispersion of the polymer can be achieved. Depending on the particular solid polymeric waste employed, complete dissolution may be achieved with little or no gas evolution. Furthermore, depending on the temperature used, a significant degree of depolymerization occurs as indicated by the viscosity of the solution or mixture. The resultant liquid resembles a crude oil and is catalytically cracked or mixed with conventional cracking stock and then cracked to gasoline and distillates. A portion of the distillates may be recycled and used in the dispersion/dissolution step.

DETAILED DESCRIPTION OF THE INVENTION

Figure 1:
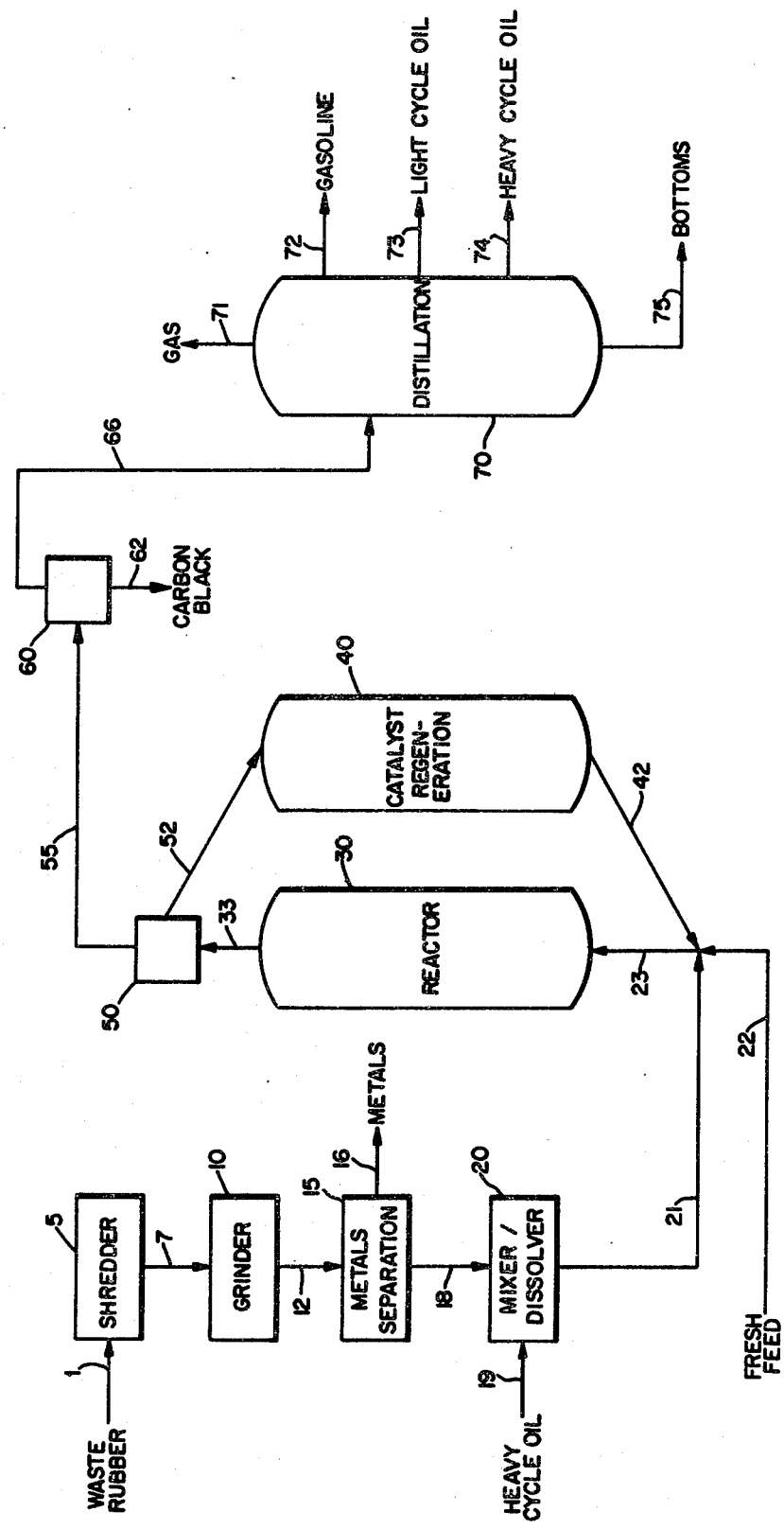
FIG. 1 is a schematic flow diagram of a preferred embodiment of the invention.

The present invention involves the treatment of plastics which fall into various categories. Generally, the plastics employed are dictated by their commercial importance. For instance, it has been found that a typical plastics waste for disposal comprises on the average approximately 50 percent polyvinyl chloride, approximately 30 percent polystyrene, and the remaining approximately 20 percent various other plastics such as polyethylene, polypropylene, polyesters, polyacrylics, and the like. Thus, for the most part waste plastics fall into three important categories: poly(halogenated hydrocarbons), poly(straight-chain olefins), and poly(vinyl aromatics). The representative and most commercially important members of these three categories are polyvinyl chloride, polyethylene, and polystyrene, respectively. Accordingly, these three particular plastics will be discussed herein as exemplary members of the categories embraced by this invention and should not be considered limiting thereof.

The word rubber as used herein shall be understood to mean natural and synthetic rubbers and includes plantation rubber, thiokols, neoprenes, nitrile rubbers, styrene rubbers, butyl rubbers, polybutadiene, silicone rubbers, acrylate rubbers polyurethanes, flurorubbers, etc.

The rubbers and plastics to be treated by this invention encompass a wide variety of solid polymeric materials. The properties of these materials vary widely, depending on compounding, fabrication, thermal history, and many other variables. It is apparent that not all of these materials can be dissolved in the petroleum-derived streams employed in the process of this invention. However, dissolution, while preferred is not necessary to the operability of the process—the dispersal of the rubber and plastics in the petroleum medium and the subsequent cracking of the dispersion will normally produce highly desirable products. Nevertheless, certain polymeric materials are so resistant to decomposition by the process of this invention that it is desirable to avoid using them as feeds. Generally, such materials may be described as thermosetting resins, i.e., resins subject to crosslinking reactions at temperatures necessary to induce flow so that the ability to flow is rather quickly lost in favor of form stability.

Rubbers and plastics may be treated alone or together according to the process of this invention. However, the solid polymeric feed should be free of inorganic material such as glass or cellulosic materials. If the material to be treated is soluble in the petroleum oil, the inorganic, insoluble components in the composite can be separated by filtration, sedimentation, or other known separation methods during or after dissolution and the clarified solution can be catalytically cracked as will be described in more detail below.

It may be desirable to subject the polymeric feed to a size reduction step prior to the addition of the petroleum oil. If the feed is insoluble in the petroleum oil, a size reduction step is highly preferred. A variety of size reduction means are well known in the art and any of these means may be employed in the process of the present invention.

Rubber tires to be treated according to the process of this invention, are preferably pretreated for removal of metals. Pretreatment may consist of size reduction by conventional shredding and grinding followed by magnetic separation of the metals contained in the rubber tires. Although tire cord may also be removed from the rubber feed, such a separation is not necessary according to the process of this invention since the fibers dispersed in the slurry feed to the catalytic cracker will decompose at cracking temperatures.

The selected petroleum-derived streams employed in the process of this invention are thermally stable, highly polycyclic aromatics mixtures which result from one or more petroleum refining operations. Thermally stable petroleum fractions are high boiling petroleum-derived streams such as fluidized catalytic cracker (FCC) bottoms fractions which contain a substantial portion of polycyclic aromatic/naphthenic hydrocarbon consituents such as derivatives of naphthalene, dimethylnaphthalene, anthracene, phenanthrene, fluorene, chrysene, pyrene, perylene, diphenyl, benzothiophene, and partially hydrogenated forms thereof. Such refractory petroleum media are resistant to conversion to lower molecular products by conventional non-hydrogenative procedures. Typically, these petroleum refinery streams and recycle fractions are hydrocarbonaceous mixtures having an average carbon to hydrogen ratio in the range of 0.6 to 1.3, and a boiling point above about 450° F. Representative petroleum fractions suitable for use in this invention include FCC main column bottoms; TCC syntower bottoms; asphaltic material; alkane-deasphalted tar; coker gas oil; heavy cycle oil; light cycle oil; clarified slurry oil; anthracene oil; coal tar; mixtures thereof, and the like.

The nominal properties of suitable petroleum fractions are as follows:

| Main Column Bottoms | |
|---|---|
| Sulfur | 1.13% |
| Nitrogen | 450 ppm |
| Pour Point | 50° F. |
| 5% Boiling Point | 640° F. |
| 95% Point | 905° F. |
| Conradson Carbon | 9.96 |
| Clarified Slurry Oil | |
| Sulfur | 1.04% |
| Nitrogen | 4400 ppm |
| Pour Point | 50° F. |
| 5% Boiling Point | 630° F. |
| 95% Point | 924° F. |
| Conradson Carbon | 10.15 |
| Heavy Cycle Oil | |
| Sulfur | 1.12% |
| Nitrogen | 420 ppm |
| 5% Boiling Point | 450° F. |
| 95% Point | 752° F. |
| Conradson Carbon | 0.15 |

Catalytic cracking is the process of converting large molecules into smaller ones by the application of heat and catalysts. Numerous methods are known in the prior art for catalytically cracking petroleum-derived streams. The use of any of these methods are within the scope of this invention, including fluidized catalytic cracking employing a finely-divided solid catalyst which is maintained at all times as a simulated fluid by suspension in the reacting vapors or in the regenerating air, moving bed catalytic cracking, and thermofor catalytic cracking (TCC) employing a flowing bead-type catalyst.

In a "fluidized catalytic cracking" process (or FCC) catalyst particles are used which are generally in the range of 10 to 150 microns in diameter. The commercial FCC processes include one or both of two types of cracking zones. i.e., a dilute bed (or "riser") and a fluid (or "dense") bed. Useful reaction conditions in fluid catalytic cracking include temperatures above 850° F., pressues from subatmospheric to 3 atmospheres, catalyst-to-oil ratios of 1 to 30, oil contact time less than about 12 to 15 seconds in the "riser," preferably less than about 6 seconds, wherein up to 100 percent of the desired conversion may take place in the "riser," and a catalyst residence (or contact) time of less than 15 minutes, preferably less than 10 minutes, in the fluidized (or dense) bed.

The catalyst employed in the FCC reactor is characterized by a low sodium content and is an intimate admixture of a porous matrix material and a crystalline aluminosilicate zeolite, the cations of which consist essentially, or primarily, of metal characterized by a substantial portion of rare earth metal, and a structure of rigid three-dimensional networks characterized by pores having a minimum cross-section of 4 to 15 Angstroms, preferably between 6 and 15 Angstrom units extending in three dimensions.

The crystalline aluminosilicate catalyst is intermixed with a material which dilutes and tempers the activity thereof so that currently available cracking equipment and methods may be employed. In a preferred embodiment, there are utilized materials which do more than perform a passive role in serving as a diluent, surface extender or control for the highly active zeolite catalyst component. The highly active crystalline aluminosilicate zeolite catalyst is combined with a major proportion of a catalytically active material which, in such combination, enhances the production of gasoline of higher octane values than are produced by cracking with such zeolitic catalysts alone, while concomitantly providing a composite catalyst composition which may be used at much higher space velocities than those suitable for other types of catalysts, and which composite catalyst composition also has greatly superior properties of product selectivity and steam stability.

The crystalline aluminosilicates employed in preparation of catalysts may be either natural or synthetic zeolites. Representative of particularly preferred zeolites are the faujasites, including the synthetic materials such as Zeolite X described in U.S. Pat. No. 2,822,244; Zeolite Y described in U.S. Pat. No. 3,130,007; as well as other crystalline aluminosilicate zeolites having pore openings of between 6 and 15 Angstroms. These materials are essentially the dehydrated forms of crystalline hydrous siliceous zeolites containing varying quantities of alkali metal and aluminum, with or without other metals. The alkali metal atoms, silicon, aluminum and oxygen in these zeolites are arranged in the form of an aluminosilicate salt in a definite and consistent crystalline pattern. The structure contains a large number of small cavities interconnected by a number of still smaller holes or channels. These cavities and channels are uniform in size. The alkali metal aluminosilicate used in preparation of the present catalyst has a highly ordered crystalline structure characterized by pores having openings of uniform sizes within the range greater than 4 and less than 15 Angstroms, preferably between 6 and 15 Angstroms, the pore openings being sufficiently large to admit the molecules of the hydrocarbon charge desired to be converted. The preferred crystalline aluminosilicates will have a rigid three-dimensional network characterized by a system of cavities and interconnecting ports or pore openings, the cavities being connected with each other in three dimensions by pore openings or ports which have minimum diameters of greater than 6 Angstrom units and less than 15 Angstrom units. A specific typical example of such a structure is that of the mineral faujasite.

The effluent from the FCC reactor is subjected to a separation procedure for removal of the suspended solid catalyst. Cyclone separators are a preferred means.

The hydrocarbon phase which is obtained from this separation procedure is passed into a product fractionator, i.e., a main column distillation unit, wherein the product stream is separated into heavy oil recycle fractions, middle gasoline fractions, and light end fractions. The residual fraction is a highly aromatic hydrocarbon mixture referred to as "FCC main column bottoms".

Referring to FIG. 1 of the drawings, a preferred embodiment of this invention is schematically portrayed wherein rubber tires are converted in a fluidized catalytic cracking unit. Waste rubber is continuously fed through line 1 to shredder 5 and then passes through line 7 to grinding zone 10. The rubber is ground to a size within the range from about ¼-inch or ½-inch or less. The particulate rubber then passes through line 12 to metals separation zone 15 and the metals are removed via line 16. The means employed to separate metals from the particulate rubber can be a magnetic separation device, a classification device separating according to density such as shaking table, and the like, The essentially metals-free particulate rubber leaves separation zone 15 through line 18 for slurrying in zone 20 with heavy cycle oil from the product fractionator 70 which is introduced into zone 20 via line 19. These two feedstreams are mixed and maintained in zone 20 at a temperature within the range from about 500° to 700° F. for a sufficient time for dissolution and/or dispersion to occur. Although tire cord or other fibrous material may be left in the particulate rubber, it can be removed either before or after the particulate rubber is slurried with heavy cycle oil in zone 20. For example, a caustic solution can be used to remove fibrous materials prior to slurrying in zone 20 or separation means such as a simple screen or filter may be used to remove fibrous material from the rubber/heavy cycle oil mixture passing from zone 20. If desired, fresh feed may be added through line 22 to the modified recycle feed passing through line 21 to the riser 23. The fresh feed may be any of a wide variety of hydrocarbons ranging from naphthas to vacuum gas oils and coker distillates.

Modified recycle feed and fresh feed, if desired, are charged into a hot regenerated catalyst stream passing from the catalyst regeneration zone 40 through line 42 to the riser 23 and passes through the reactor 30 via line 33 to catalyst separation zone 50 which zone will usually be a cyclone vessel. The reactor velocity is sufficient to maintain the catalyst and any particulate rubber present in random motion with no carryover of catalyst but complete carryover of fine, undissolved, solid components of the tire-rubber compound such as carbon black and other reinforcing or nonreinforcing rubber fillers and small amounts of ingredients such as zinc oxide and titanium oxide. This is possible since the catalyst employed will have a size range approaching 150 microns whereas the undissolved tire-rubber components will be smaller than 50 microns in diameter. Reaction conditions include temperatures above about 850° F., pressures from subatmospheric to 3 atmospheres, catalyst to feed ratios ranging from 1 to 30, feed contact times less than about 12 to 15 seconds in the riser 23 (preferably less than about 6 seconds) wherein up to 100% of the desired conversion may take place, and a catalyst residence time of less than 15 minutes (preferably less than 10 minutes) in the fluidized (or dense) bed in the reactor 30.

Products disengaged from the catalyst pass from the catalyst separation zone 50 via line 55 to the secondary separation zone 60 wherein solid, undissolved tire-rubber components (e.g., carbon black) are separated from the hydrocarbon product. The solids are recovered through line 62 and are suitable to be reused for compounding rubber, water treatment, pigments, filler and insulation, or for combustion as a solid carbonaceous material. The hydrocarbon product is removed from secondary separation zone 60 through line 66 to product fractionator 70 and is separated into desired hydrocarbon product streams, such as gasoline withdrawn via line 72, light cycle oil withdrawn via line 73, heavy cycle oil withdrawn via line 74, a bottoms fraction withdrawn via line 75, and gaseous fraction withdrawn via line 71. A portion of the heavy cycle oil 74 is returned to zone 20 via line 19. The sulfur content of the feed rubber is converted to $H_2S$ and may be recovered as sulfur from the gaseous fraction withdrawn from the product fractionator 70 via line 71 by known methods such as by processing in a Claus plant.

The spent catalyst passes from the catalyst separation zone 50 passes through line 52 to the catalyst regeneration zone 40 where the carbon deposited on the catalyst is burned off and the regenerated catalyst again enters the incoming charge stream via line 42 to repeat the cycle.

Although the foregoing preferred embodiment described the treatment of rubber according to the process of this invention, plastics such as poly(halogenated hydrocarbons), poly(straight-chain olefins), and poly(vinyl aromatics) can be treated similarly. Of course, when plastics are treated the secondary separation zone 60, which was described for the treatment of rubber to remove fine, undissolved, solid tire-rubber components (e.g., carbon black) is unnecessary. Similar to the treatment of rubber, the initial plastic treatment step according to the invention comprises placing the plastic products in a grinding, cutting or granulating apparatus to reduce the scrap product to particles or shreds. Any one or combination of a number of devices may be used for fragmenting or particulating the plastic including mill cutters, granulators and the like. The mill cutters may be selected from any desired size depending on the size of the bottle, container or other product which is to be ground by the cutting tool. Further, the spacing and number of teeth on the cutting head or bit may also be varied depending on the size or size range of the particles desired to be obtained. For example, where relatively narrow plastic bottles of the type commonly used for liquid detergents, shampoo and the like are to be ground, the mill cutter surface may be between about 1 and about 2 inches long and any suitable diameter. The spacing, number and depth of the cutting teeth may be varied as well as the speed at which the cutter is turned depending on the rate of cutting or grinding desired and particle size.

The grinding phase may also be carried out in one or more steps as desired. Thus, the first phase may utilize a rough grinding mill cutter which yields rather coarse particles, ribbons or grannules of the plastic which particles may thereafter be further directed to a fine grinding step to yield finer particles. In addition, a granulator apparatus may be used in a single step, which apparatus is known to include rotor knives in combination with a sieve whereby the coarser particles which do not pass through the sieve openings or apertures are further ground or cut until the desired small particle size is achieved. Again, such apparatus is well known to those skilled in the art and need not be described in further detail. Obviously, depending on the type of grinding equipment used, be it rough or fine, particle sizes will vary. However, particles capable of passing through 5-25 mesh screens will be suitable for most uses.

It may be desirable to employ a second step which comprises washing of the ground plastic particles to remove non-plastic materials such as paper, labels, container residue, metal particles and the like. In addition, if extensive non-thermoplastic materials are present such as bottle caps and the like, these may be removed prior to the initial grinding step. For example, the bottles or containers may be passed through pinch rollers and over-sized grates whereby the smaller cracked bottle caps, etc. will be separated by falling through the grate.

The washing step is accomplished by any desirable means such as soaking the plastic particles in a liquid, usually aqueous, with suitable agitation. The liquid should be of a specific gravity so that the plastic particles may be floated away from the non-plastic materials and thereafter recovered on a sieve or screen. If a further fine grinding step is then desired, depending on the apparatus chosen, it may then be carried out on the recovered plastic particles.

During the grinding or granulating phase, it may also be desirable to use an antistatic agent—especially where the particles are subjected to a fine grinding operation. It has been found that where relatively small particles are produced, the static electrical charges may cause difficulty in handling or recovering the particles from the cutter. Accordingly, when the wash solution contains antistatic agents such as high molecular weight fatty alcohols or other known polymeric antistatic agents, the static electrical problems will be obviated.

In the case of rubber and plastic wastes containing high concentrations of poly(halogenated hydrocarbons) such as polyvinyl chloride, the process of this invention provides a convenient way of eliminating the halogen. For example, when polyvinyl chloride is treated, HCl may be separately recovered from the gaseous fraction withdrawn from the product fractionator 70 via line 71 by known methods such as by scrubbing.

The present invention will be further described by the following specific examples which are given by way of illustration and not as limitations on the scope of the invention.

EXAMPLE 1

Used whole tire was dissolved in Torrance heavy cycle oil at 650° F. in 1 hour. No gaseous product was produced. The tire/cycle oil solution was suitable for use as a feed to a catalytic cracking unit.

EXAMPLE 2

Polyethylene bag was dissolved in Torrance heavy cycle oil at about 400° F. in 20 minutes. No gaseous product was formed. The polyethylene/cycle oil solution was suitable for use as a feed to a catalytic cracking unit.

EXAMPLE 3

Polystyrene foam was dissolved in Torrance light cycle oil at 150° F. in 10 minutes. When the polystyrene concentration was increased to 40 percent by weight, the resulting solution became highly viscous.

EXAMPLES 4-14

Whole tire was first dissolved in heavy cycle oil. Dunlop tire (rubber and fibre only) was shredded. Tire (75 grams) and Torrance FCC heavy cycle oil (HCO) (75 grams) were then heated in a stirred autoclave for 3 hours at 575° F. The tire completely dissolved to give a pasty material. A control run was also carried out using HCO in the absence of tire.

The rubber/HCO solution and HCO were then cracked. The cracking apparatus consisted essentially of a vertical downflow, annular vycor reactor charged with 5 grams 14/30 silica-alumina (46AI) followed by 10 mls 14/30 vycor chips. The catalyst was pretreated at reaction temperature (900° or 950° F.) for 1 hour. The liquid/paste (0.1 gram) was injected every minute directly onto the catalyst from a metal syringe internally threaded so that one complete turn of the barrel corresponded to 0.4 to 0.45 gram. Helium passed through the reactor continually. Gas and liquid fractions were collected. The liquid was analyzed by gas chromatography using a silicone gum rubber column. Coke (including carbon black) was estimated by weighing the reactor before and after each run. For thermal runs, a reactor packed completely with 14/30 vycor chips was used.

When enough sample was available (about 1 gram as in examples 1a, 1b, 2a, 2b below) vacuum distillations were done to yield 800° F.− and 800° F.+ fractions. In these instances the total 800° F.+ fraction comprised the sum of both the 800° F.+ residue from the distillation and the 800° F.+ "tail" determined by gas chromatographic analysis of the 800° F.− fraction.

Complete results are shown in Table I.

In order to determine whether synergistic effects occur when mixtures of rubber and HCO are fed to a catalytic cracker, the results of Examples 10, 11, 12 and 14 were analyzed to "back-out" values for the tire and heavy cycle oil components of the feed. A summary of yields calculated by this analysis are shown in Tables II and III.

duced 25 percent. However, 8.6 percent $C_3^-$ gas is also formed. Catalytic runs at 900° F. at twice the apparent contact time resulted in conversions similar to those obtained at 950° F. (compare Examples 12 and 14 in Table III).

Table I

| | Pulse-Cracking of Whole Tire/Heavy Cycle Oil (1:1 Mixture) | | | | | | | | | | |
|---|---|---|---|---|---|---|---|---|---|---|---|
| | F.C.C. Heavy Cycle Oil (HCO) | | | | | | Tire/HCO (1:1 mixture) | | | | |
| Example No. | 4 | 5 | 6 | 7 | 8 | 9 | 10 | 11 | 12 | 13 | 14 |
| Pretreatment Temp. (°F.) | ← | ←→ | → | 57 | ← | → | ← | ←→ | → | 575 | ← | → |
| Time (hr) | ← | ←→ | → | 3 | ← | → | ← | ←→ | → | 3 | ← | → |
| High Temperature Treatment | | | | | | | | | | | |
| Reactor Packing | — | — | Vycor | ←Silica Alumina→ | | | — | Vycor | ←Silica/Alumina→ | | |
| Temperature (°F.) | — | — | 950 | 950 | 900 | 900 | — | 950 | 950 | 900 | 900 |
| Apparent Contact Time (sec)[a] | — | — | 0.38 | 0.38 | 0.75 | 0.75 | — | 0.38 | 0.38 | 0.75 | 0.75 |
| Weight of Feed (g) | — | — | 2.32 | 2.58 | 2.15 | 1.91 | — | 1.86 | 1.20 | 2.18 | 1.43 |
| Recovery (wt. %) | — | — | 107 | 85 | 99 | 105 | — | 112 | 124 | 104 | 110 |
| Product Yield[b] | | | | | | | | | | | |
| Gas | 0 | 0 | 0 | 2.74 | 0 | 0 | 0 | 0 | 8.04[c] | 0 | 6.96 |
| Liquid 420F$^-$ | .15 | .13 | .13 | 3.00 | 3.44 | 3.50 | 0 | 0.54 | 4.02 | 2.07 | 7.89 |
| 420F to 650F | 31.69 | 32.31 | 25.72 | 34.53 | 40.57 | 38.27 | 14.91 | 23.78 | 29.99 | 26.35 | 35.28 |
| 650F to 800F | 62.26 | 61.38 | 65.78 | 47.54 | 45.34 | 51.29 | 37.26 | 35.37 | 29.46 | 38.64 | 25.46 |
| 800+ | 2.10 | 5.76 | 7.63 | 3.69 | 1.86 | 1.99 | 4.22 | 19.14 | 3.68 | 4.28 | 1.97 |
| Residue 800+ | 3.80 | .04 | — | — | — | — | 43.60 | — | — | — | — |
| Residue in Reactor | — | — | 0.74 | 8.51 | 8.79 | 4.95 | — | 21.19 | 24.81 | 28.67 | 22.44 |

[a] Based on 7.5 ml catalyst; helium flow rate is either 1200 ml/m or 600 ml/m
[b] Normalized on a "No Weight Loss Basis"
[c] Analysis (wt. %): 12.9% $C_1$, 12.4% $C_2H_4$, 4.0% $C_2H_6$, 37.7% $C_3H_6$, 2.3% $C_3H_8$, 28.1% $C_4$, 2.8% $C_5$

TABLE II

Summary of Product Yields for Heavy Cycle Oil (Wt.%)

| Example(s) | Estimated $C_3^-$ | $C_4$ to 420$^-$F | 420–800 | 800+ |
|---|---|---|---|---|
| 4 As is | 0 | 0.2 | 94.0 | 5.9 |
| 5 Autoclave, 575° F., 3 hr | 0 | 0.1 | 93.7 | 5.8 |
| 6 Thermal cracking, 950° F. 0.38 sec. | 0 | 0.1 | 91.5 | 8.3 |
| 7 Catalytic cracking, 950° F., 0.38 sec. | 1.9 | 3.8 | 82.0 | 12.2 |
| 8 Catalytic cracking, 900° F., 0.75 sec. | 0 | 3.5 | 87.8 | 8.8 |

TABLE III

Summary of Product Yields for Tire (backed-out data) (Wt.%)

| Example(s) | Estimated $C_3^-$ | $C_4$ to 420$^-$F | 420–800 | 800+ |
|---|---|---|---|---|
| 9 As is | 0 | 0 | 6.1 | 93.9 |
| 10 Autoclave, 575° F., 3 hr | 0 | 0 | 16.8 | 83.6 |
| 11 Thermal cracking, 950° F., 0.38 sec. | 0 | 0.9 | 31.6 | 67.5 |
| 12 Catalytic cracking, 950° F., 0.38 sec. | 8.6 | 8.9 | 40.2 | 42.4 |
| 14 Catalytic cracking, 900° F., 0.75 sec. | 4.4 | 8.3 | 41.7 | 45.7 |

Example 10 shows the effect of dissolution of tire in heavy cycle oil. Example 5, a control run, was made with HCO alone in the autoclave. Examples 4 and 5 show that the autoclave treatment had only a minor effect on HCO. Comparison of the corresponding values for the tire component ("as is" example and Example 10 in Table III) indicates that some conversion of 800° F.+ fraction to 800° F.− fraction has occurred.

Figure 2:
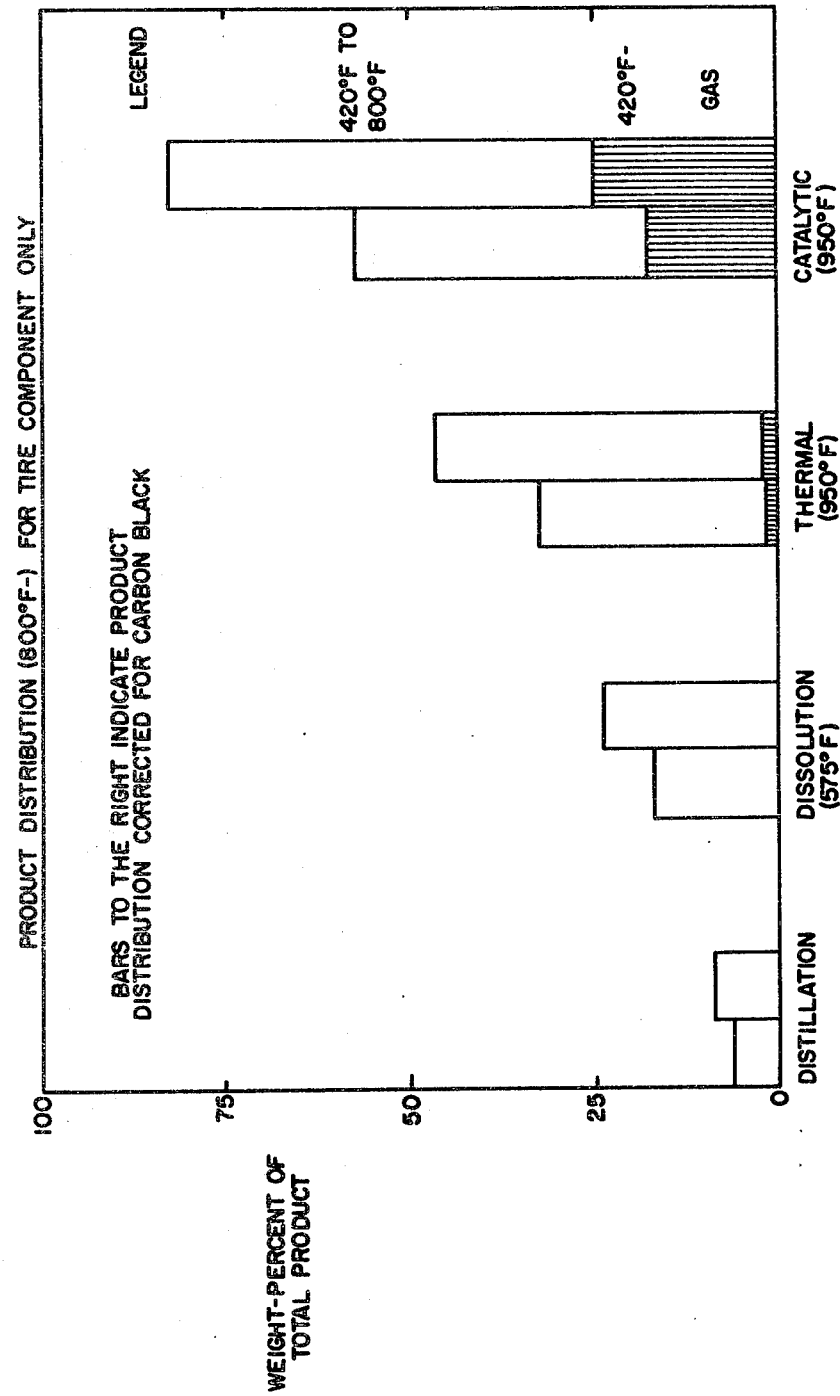
FIG. 2 is a graphical summary of the 800° F.− product distribution for the tire component of Examples 4–14.

Thermal runs at 950° F. are shown as Examples 6 and 11 in Table I. Comparisons of the "backed-out" values for the feed (See Example 5 in Tables II and Example 10 in Table III) with the results of these thermal runs indicate that the total 800° F.+ fraction of the tire is reduced by 16 percent. Corresponding catalytic runs using silica-alumina catalyst are shown in Examples 7 and 12. The 800° F.+ fraction of the tire component is further re- "Backed-out" values for the tire product yields (see Examples in Table III) are summarized by the bars on the left of each pair in FIG. 2. The various "treatments" on the abcissa are arranged to show the progressive increase in yield of the 800° F.− fractions as one moves to the right of the axis. Since about 30 percent of the tire component is refractory carbon black, it was of interest to subtract this amount from the "backed-out" yields. In FIG. 1 the bars to the right of each pair represents the so-adjusted yields.

These Examples demonstrate that, if one assumes the original tire contains 30 percent carbon black, about 80 percent of the non-refractory part of the 800° F.+ fraction of the tire component is converted to 800° F.− material, of which about 12 percent is $C_3^-$ gas. A comparison of the thermal and catalytic runs illustrated in FIG. 1 establishes the clear superiority of the process of this invention over the thermal cracking methods employed in the prior art to treat rubber and, furthermore, supports the same inference as to treating plastics.

What is claimed is:

1. A process for the conversion of solid plastic wastes selected from the group consisting of poly(halogenated hydrocarbons), poly(straight-chain olefins), and poly(vinyl aromatics) to distillates including a gasoline fraction which comprises:
   (a) grinding the wastes,
   (b) adding a selected petroleum-derived stream to the ground wastes,
   (c) maintaining the resulting mixture at a temperature of about 150° to 700° F. for a sufficient time for dissolution to occur,
   (d) feeding the resulting solution to a catalytic cracking zone operated at a temperature of 850° F. or more and a pressure from subatmospheric to 3 atmospheres,
   (e) withdrawing a cracked product from the catalytic cracking zone, and
   (f) distilling the cracked product to recover distillates including a gasoline fraction.

2. The process of claim 1 wherein the solution of solid plastic wastes is mixed with conventional cracking stock prior to being fed to the catalytic cracking zone.

3. The process of claim 2 wherein a portion of the recovered distillates is the selected petroleum-derived stream.

4. The process of claim 1 wherein the solid plastic wastes are ground to particles capable of passing through 5 to 25 mesh screens.

5. The process of claim 1 wherein the solid plastic wastes contain poly(halogenated hydrocarbons) and hydrogen chloride is recovered from a gaseous fraction distilled from the cracked product.

* * * * *

UNITED STATES PATENT AND TRADEMARK OFFICE
CERTIFICATE OF CORRECTION

PATENT NO. : 4,175,211

DATED : November 20, 1979

INVENTOR(S) : Nai Yuen Chen and Tsoung-Yuan Yan

It is certified that error appears in the above-identified patent and that said Letters Patent is hereby corrected as shown below:

Title page, 1st. column, after "[*] Notice", "The portion of the term of this patent subsequent to Aug. 22, 1978, has been disclaimed." should read --The portion of the term of this patent subsequent to Aug. 22, 1995, has been disclaimed.--

Signed and Sealed this

First Day of December, 1992

Attest:

DOUGLAS B. COMER

Attesting Officer

Acting Commissioner of Patents and Trademarks